Figure 2:
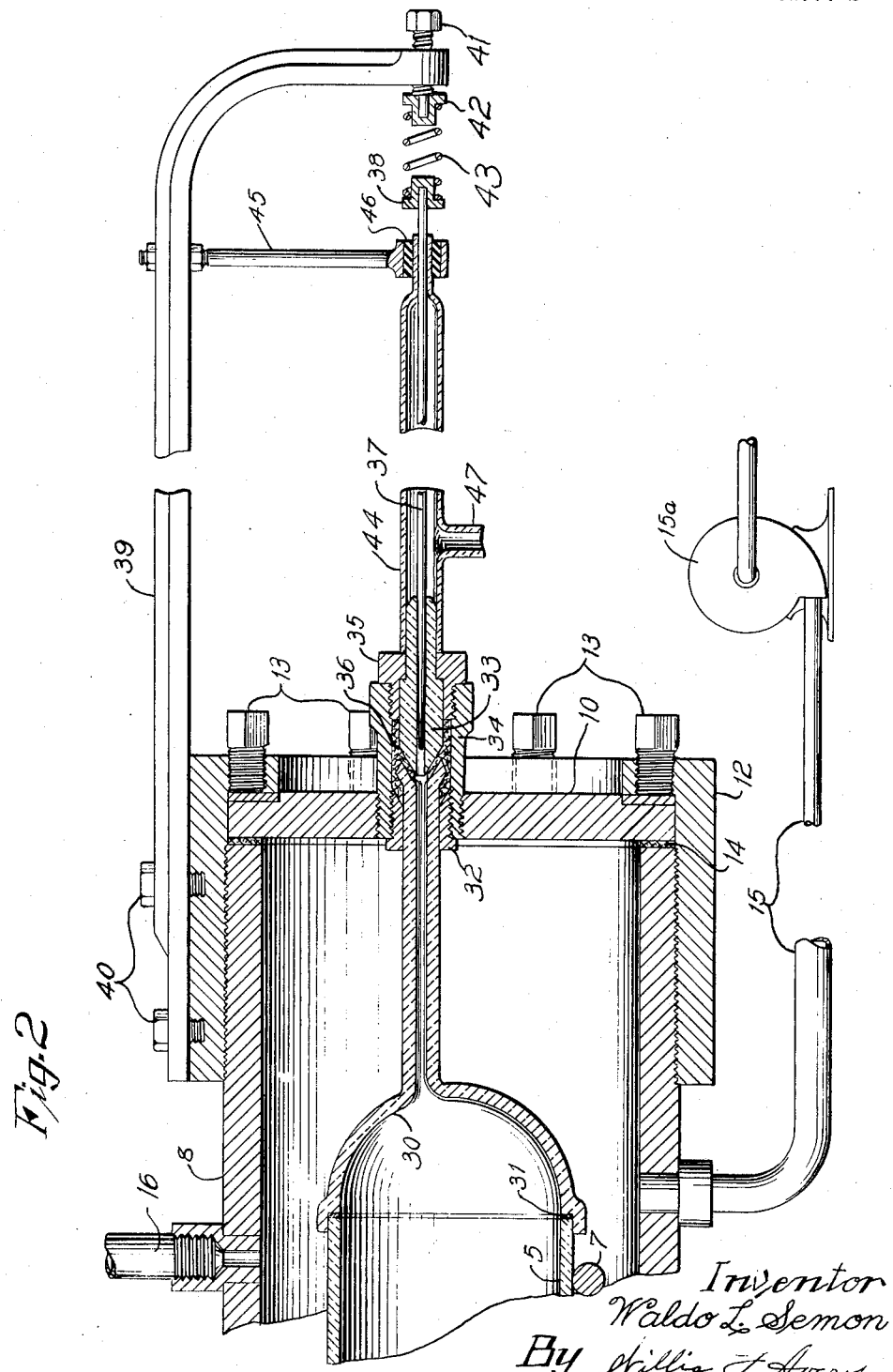

June 11, 1940.　　　W. L. SEMON　　　2,204,156
CONTINUOUS REACTOR
Filed June 21, 1937　　　2 Sheets-Sheet 1
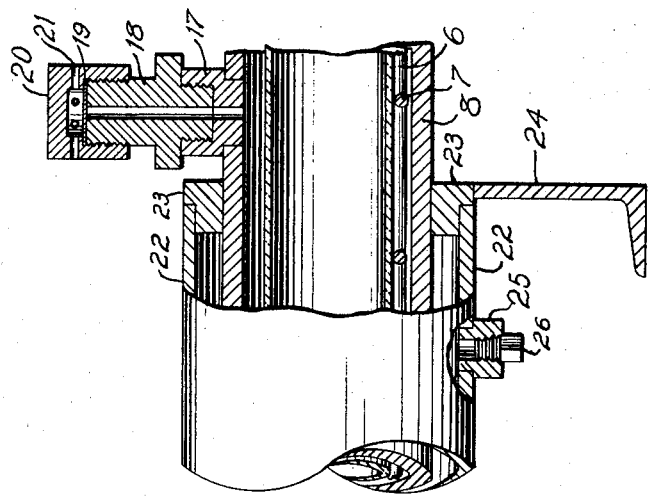
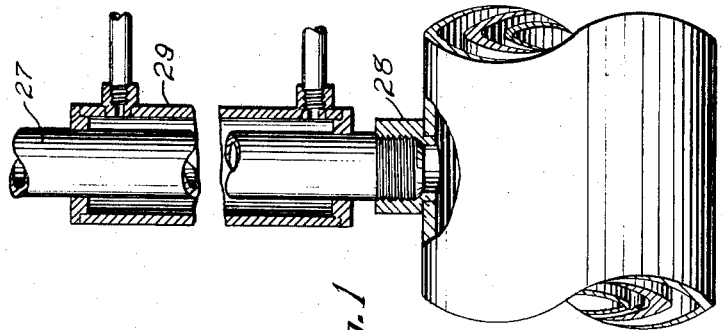
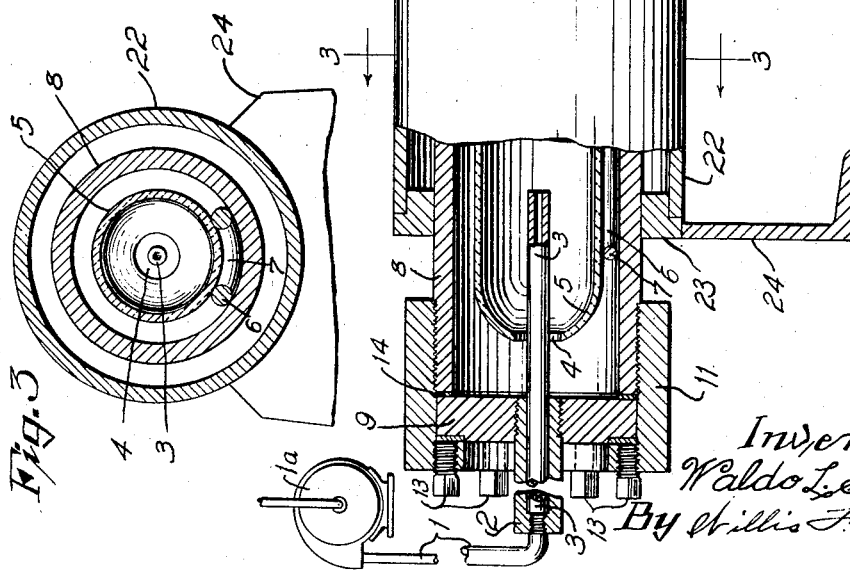
Inventor
Waldo L. Semon
By Willis F. Avery
Att'y Patented June 11, 1940

2,204,156

UNITED STATES PATENT OFFICE 2,204,156

CONTINUOUS REACTOR

Waldo L. Semon, Silver Lake Village, Ohio, assignor to The B. F. Goodrich Company, New York, N. Y., a corporation of New York Application June 21, 1937, Serial No. 149,366

3 Claims. (Cl. 23—290)

This invention relates to a continuous reactor for producing organic chemicals. More specifically, it relates to an apparatus into which corrosive reactants are continuously introduced and from which products are continuously removed without interrupting the reaction.

As a general rule, reactions which are used to synthesize organic compounds require considerable time, usually hours and even days to reach completion. Since high temperature and pressure usually shorten the time, preparations are often made in autoclaves in which these conditions may be achieved. The charge of reactants is run into the cool autoclave and is then heated at the desired temperature and pressure. When the reaction is finished, the autoclave is usually cooled and the pressure is released before the contents are removed. Thus, much heat is lost by the cooling between the successive runs, and the autoclave is not operating for considerable periods of time while it is being discharged and recharged.

Where corrosive charges are to be used, the difficulties are multiplied. Many common organic compounds are prepared from reactants which have a corrosive action upon metals, hence autoclaves lined with glass or other inert ceramic material must be used. These linings usually have a low rate of heat transfer, and additional time is required to bring the charges to a reacting temperature.

It is an important object of my invention to provide a reactor which can be used continuously, thereby eliminating the necessity of periodically being emptied and refilled. Other objects are to provide a reactor which does not have to be cooled to be discharged, to provide a reactor of small capacity which will produce a large amount of the product per unit time, and to provide a corrosion-resistant lining in a reactor in which the problem of the rate of heat transfer is minimized. Other objects will be apparent from the following description and the drawings which are made a part thereof.

In the accompanying drawings, Figs. 1 and 2, taken together, form a perspective view, partly broken away and in section, of the reactor, Fig. 2 being on a somewhat larger scale than Fig. 1.

Fig. 3 is sectional view taken on line 3—3 of Fig. 1.

Referring to the drawings, the corrosion-resistant tube 1 of silver-lined metal, leading from a conventional metering pump 1a, is tightly screwed into the nipple 2 and abuts the glass tube 3 which leads the corrosive materials through the opening 4 into the reaction chamber. The reaction chamber is enclosed by the tube 5 which I prefer to make of a corrosion-resistant low-expansion glass such as the borosilicate glass known as Pyrex. This tube is not attached directly to the outer walls of the reactor but rests upon a supporting frame consisting of the longitudinal bars 6 and the crossbars 7. The supporting frame rests upon the pressure-resisting metal tube 8 which encloses the whole glass tube 5. The tube 8 is fitted at each end with the heads 9 and 10, and the caps 11 and 12 which contain the set-screws 13 to tighten the heads against the asbestos packing 14. The tube 8 also contains the inlet 15 leading from a conventional metering pump 15a through which non-corrosive reactants enter, and the fitting 16 which leads to a pressure gauge (not shown). A safety valve is provided, consisting of the pipe socket 17 welded to the tube 8, and the pipe 18 covered with a metal disc 19 held in place by the cap 20 containing the holes 21 to permit the release of pressure if the disc blows. Most of the length of the tube 8 is surrounded by a heating jacket consisting of the tube 22 welded to the sleeve rings 23 which are, in turn, welded to the tube 8 and to the legs 24. The drain for tube 22 consists of the pipe socket 25 fitted with the plug 26. Tube 27 which opens out of tube 22 through pipe socket 28 acts as a condenser, and is surrounded by the water jacket 29.

Referring to the pressure release mechanism shown in Fig. 2, the Pyrex glass coupling 30 is joined to the tube 5 by a joint packed with asbestos packing 31. The other end of the coupling is reduced to a capillary tube and passes through the packing nut 32 and abuts the needle valve body 33 made of porcelain or other inert material, a porcelain spark plug insulator being very suitable. The needle valve body is set in the packing gland 34 which is screwed into the head 10 and contains the packing nut 35 to force the asbestos packing 36 tightly in place. The tapered end of the needle 37 which may be made of any corrosion resistant material of sufficient mechanical strength, such as the acid resistant alloy known as Hastelloy, fits tightly into the needle valve body 33 and the other end rests in the cup 38. The bracket 39 is attached on one end to the cap 12 by the screws 40, and in the other end carries the adjusting screw 41 which rests on the cup 42 holding the spring 43 against the cup 38. The glass tube 44 fits over the outer end of the needle valve body 33, and is supported on the other end by the hanger 45 attached to the bracket 39 and containing the rubber bushing 46 which fits over the glass tube. The products are continuously discharged into the glass tube 44 and leave the reactor through the outlet 47.

To illustrate the operation of the reactor, I will show in some detail the preparation of meso, meso, dimethyl acridane from acetone and diphenylamine in the presence of a concentrated hydrochloric acid catalyst. To make meso, meso, dimethyl acridane, the reactants are preferably heated at 259° C. under a pressure of 600 lbs. per sq. in. for two hours. 11.5 parts by weight of diphenylamine are heated with 1 part of acetone until the diphenylamine is entirely in solution. The solution is then continuously pumped into the reactor through inlet 15 at such a rate that it takes two hours to pass from the entrance 4 of the glass tube 5 to the needle valve 33. In operation, the solution flows through the annular space between tubes 5 and 8 to the other end of the reactor, where it enters the glass tube through opening 4. The concentrated hydrochloric acid is continuously pumped through the silver-lined tube 1 at such a rate that the volume of acid is one-tenth that of the other reagents, and enters the reaction chamber through the glass tube 3. The tube 22 is partially filled with diphenyl oxide, which boils at 259°, through the condenser tube 27, and is heated by gas burners (not shown) or other heating means underneath the reactor until the diphenyl oxide just boils. The mixture of acetone and diphenylamine become heated to 259° C. as they pass through tube 8 from inlet 15 to the entrance 4 of the reaction tube 5. When the hydrochloric acid is added, therefore, the reaction begins immediately. The reaction mixture passes through tube 5, taking two hours to go from entrance 4 to the needle valve 33. The pressure at which the valve will release the products is varied by screw 41, which is adjusted to release at a pressure of 600 lbs. per sq. in. for this particular reaction. Thus, there is a steady flow of products from the outlet 47, which, besides unreacted diphenylamine consists chiefly of meso, meso, dimethyl acridane.

The rate at which the desired products are prepared depends only on the volume of the reaction chamber 5 and the rate at which the reagents are forced through the reactor. The reactor can readily be made up in any desired size to produce the desired quantity of products, of if desired, different reaction chambers 5 of different volumes may be inserted in the shell 8, depending on the particular products which are to be prepared.

Many compounds other than meso, meso, dimethyl-acridane may be made in this reactor. The presence of solids and gases interferes with the operation of the pressure release valve, hence any solids or gases which are added or formed should be maintained in solution by suitable temperatures and pressures or by the addition of solvents. In general any reaction mixture, at least one constituent of which is non-corrosive to metal, may be handled in this reactor. The non-corrosive constituent is introduced into the metal shell 8 and becomes heated by contact with the reaction chamber 5 and finally by the heating jacket, and is at full reaction temperature before it enters the reaction chamber and encounters the other constituent. The corrosive constituent, which is preferably so chosen as to constitute only a minor portion of the total volume of the reaction mixture, is introduced directly into the heated mass of the other constituent within the corrosion-resistant reaction chamber 5 and is prevented by the flow of the materials through the reactor from reaching any portion of the pressure-resistant metal shell. The product issuing from the reaction has given up a large portion of its heat to the inflowing non-corrosive reagent and therefore requires less cooling than would otherwise be necessary.

As a further example, diphenylamine may be prepared by introducing 64 volumes of aniline as the non-corrosive reactant and 108 volumes of a mixture consisting of aniline 46.5 parts, aniline hydrochloride 64.8 parts and water 8 parts as the corrosive reactant. This corrosive reactant can be prepared by mixing together aniline 2 mols and hydrochloric acid 1 mol in a glass-lined kettle and distilling until the temperature of the liquid reaches 133° C. Aniline lost during this distillation should be replaced. The reaction by which diphenylamine is formed requires 3 hours at 302 to 310° C. at a pressure of 700 lbs. per sq. in. The charge issuing from the reactor consists of diphenylamine, aniline and ammonium chloride. It is neutralized with ammonia, the oily layer separated and distilled. The conversion to diphenylamine is about 40% and the yield based upon unrecovered aniline is 96%.

In a like manner di-p-tolylamine may be made from p-toluidine, p-toluidine hydrochloride and water.

The reaction chamber may be made of any desired corrosion-resistant material no matter how fragile, how different in thermal expansion from the metallic shell, or otherwise unsuitable for the manufacture of pressure equipment, for it is not exposed to any differential pressure or other mechanical strain. The only portions of the entire reactor which are exposed both to corrosion and mechanical strain are the tube through which the corrosion resistant constituent is introduced, and the needle valve 33 and needle 37, but these form such a small part of the apparatus that they can inexpensively be made of noble metals, corrosive-resistant alloys, or the like. The major part of the reactor is ordinarily made up of mild or medium steel pipe of a size sufficient to resist the temperature and pressure encountered and is therefore far cheaper than the specially constructed autoclaves or reactors made entirely of corrosion-resistant materials which have heretofore been employed for reactions of this type.

It is plain that this reactor, although most advantageous for carrying out pressure reactions of corrosive materials, may also be employed for reactions at atmospheric pressure by simply omitting or removing the needle 37 or the entire needle valve, or even for reacting non-corrosive materials.

Although it has been stated above that the reagents are introduced continuously, it will be understood that the introduction need not be absolutely continuous, but may consist in the injection of a succession of closely recurrent increments such as are produced by the positive displacement piston pumps ordinarily used for the positive introduction of liquid at predetermined rates into high pressure apparatus, and that the term "continuous" is employed in the claims in this sense.

Although I have herein disclosed a specific embodiment of my apparatus, it is obvious that many modifications may be made without exceeding the spirit and scope of my invention as defined in the appended claims.

I claim:

1. A reactor for the continuous reaction of reagents one of which is corrosive, comprising a shell, a corrosion-resistant reaction chamber within the shell, the shell being made of a structurally strong material different from that of the reaction chamber, the reaction chamber having at one end an outlet extending through the wall of the shell and at the other end an opening through which the contents of the shell may enter the reaction chamber, a corrosion-resistant inlet for the corrosive reagent extending through the wall of the shell and through the said opening and debouching within the reaction chamber, and an inlet into the shell for the other reagent.

2. A reactor as in claim 1 in which the inlet for the other reagent is at the end of the shell adjacent the outlet so that the reagent between the wall of the shell and the reaction chamber flows countercurrent to the reaction mixture within the reaction chamber.

3. A reactor for the continuous reaction of reagents one of which is corrosive, comprising a shell, a corrosion-resistant reaction chamber within the shell, the shell being made of a structurally strong material different from that of the reaction chamber, the reaction chamber having at one end an outlet extending through the wall of the shell and at the other end a relatively restricted opening through which the contents of the shell may enter the reaction chamber, a corrosion-resistant inlet extending through the wall of the shell and through the said opening and debouching within the reaction chamber near the open end, means for continuously feeding the corrosive reagent through the said inlet, an inlet into the end of the shell adjacent the outlet of the reaction chamber and means for continuously feeding the other reagent through the last-mentioned inlet.

WALDO L. SEMON.